No. 764,193. PATENTED JULY 5, 1904.
H. N. JASPER, Sr.
MOLD.
APPLICATION FILED APR. 23, 1904.
NO MODEL. 2 SHEETS—SHEET 1.
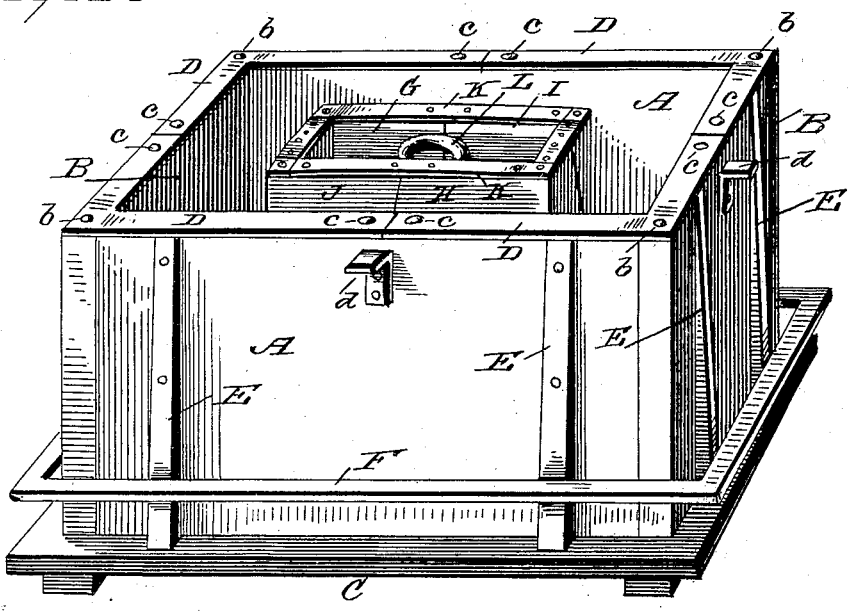
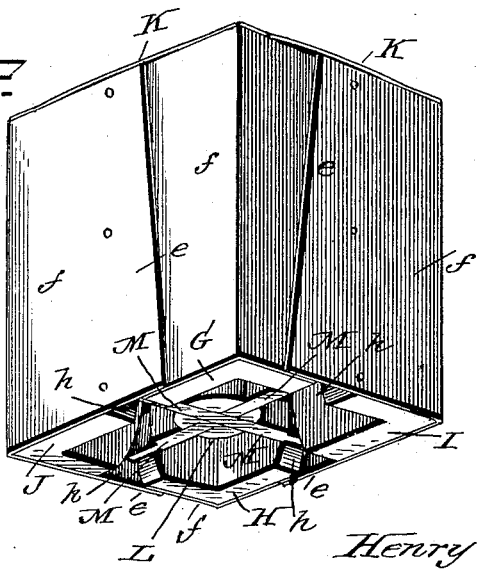
Witnesses
C. J. Williamson
M. E. Moore
Inventor
Henry N. Jasper, Sr.
By Chas. H. Fowler
Attorney No. 764,193. PATENTED JULY 5, 1904.
H. N. JASPER, Sr.
MOLD.
APPLICATION FILED APR. 23, 1904.
NO MODEL. 2 SHEETS—SHEET 2.
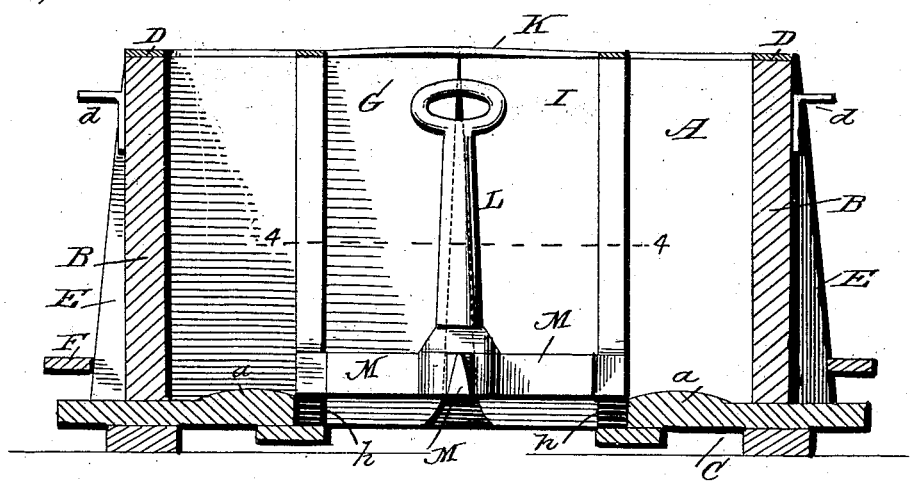
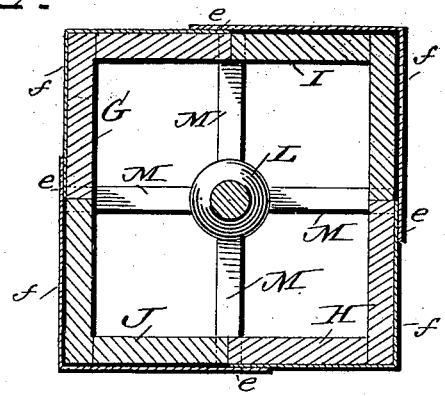
Witnesses
C. J. Williamson
M. E. Moore
Inventor
Henry N. Jasper, Sr.
By Chas. H. Fowler
Attorney No. 764,193. Patented July 5, 1904.

UNITED STATES PATENT OFFICE.

HENRY N. JASPER, SR., OF AKRON, OHIO.

MOLD.

SPECIFICATION forming part of Letters Patent No. 764,193, dated July 5, 1904.

Application filed April 23, 1904. Serial No. 204,587. (No model.)

*To all whom it may concern:*

Be it known that I, HENRY N. JASPER, Sr., a citizen of the United States, residing at Akron, in the county of Summit and State of Ohio, have invented certain new and useful Improvements in Molds; and I do hereby declare that the following is a full, clear, and exact description of the same, reference being had to the annexed drawings, making a part of this specification, and to the letters of reference marked thereon.

The present invention has for its object to provide an expansible mold that may be used in forming articles of artificial stone, concrete, earthenware, or any plastic substance capable of hardening after being removed from the mold, and in the present case the mold is especially adapted for the manufacture of chimney-blocks substantially of the character embodied in my Patent No. 722,712, dated March 17, 1903.

The invention consists in an expansible mold constructed substantially as shown in the drawings and hereinafter described and claimed.

Figure 1 of the drawings is a perspective view of a mold complete constructed in accordance with my invention; Fig. 2, a perspective view of the core of the mold; Fig. 3, a sectional elevation of Fig. 1; Fig. 4, a horizontal section of the core, taken on line 4 4 of Fig. 3.

In the accompanying drawings, A and B represent the outer walls of the mold, of any suitable material and shape found best adapted to the purpose and when in use rests upon a support or platform C, having the convex surfaces *a* to give a concave form to the under side or end of the chimney-block or at its ends, the mold herein described being especially adapted to the manufacture of blocks of plastic material for the construction of chimneys, as shown in my patent hereinbefore referred to. The walls A B are not rigidly connected together at their joints, but are free to be moved outwardly to increase the opening in the mold to facilitate the withdrawal of the molded article. The expansible walls are held in their normal position in the following manner, which will admit of the walls being moved outward independent of each other: Four right-angle spring-plates D are connected to the end and side walls of the mold, each plate being attached by suitable fastenings *b c* to a portion only of the end wall and the side wall and upon the upper edge thereof, as shown in Fig. 1 of the drawings, thereby providing means for automatically throwing out the walls a sufficient distance to enlarge the opening in the mold to facilitate the withdrawal of the molded article. It should be understood that the plates D are not only of spring metal, but sufficiently thin to act in throwing outward the walls of the mold when released, and to insure the perfect action of the plates there are only three fastenings used for each one of said plates—viz., one at the apex of the angle formed by the arms of the plate, as shown at *b*, and one at each of the extremities thereof, as indicated at *c*. This limited attachment of the spring-plates will allow of that portion thereof between the fastenings to take a slight curve in a downward direction, which is the normal shape of the plates when the walls of the mold are released. The spring-plates D are on a slight curve before securing them in place on the mold, and the limited number of fastenings used will be sufficient to hold them in place upon the walls and hold the plates flat against the tendency to assume their original curved form when the walls are held against outwardly expanding.

The side and end walls of the mold are provided with wedge-shape bearings E, which extend the entire height of the walls, with which engages the locking-frame F, as shown in Fig. 1 of the drawings, suitable stops *d* holding the frame against being disconnected from the mold by limiting its upward movement, one of said stops being connected to each side wall and each end wall of the mold and may be of any preferred construction.

In Fig. 1 of the drawings the outer walls A B, which form together the side and end walls of the mold, are held against expanding by means of the locking-frame F, which is tightly held down against the walls through the medium of the wedge-shape bearings E, which also draws the walls tightly together.

As the locking-frame F is raised to release the side and end walls A B the spring-plates D will be no longer held down flat against the edges of said walls, but will be free to assume their normal form, which is slightly on a curve in a downward direction, which will throw out the walls of the mold, and thereby enable the molded article held thereby to be more conveniently removed, after which the locking-frame is again forced down upon the wedge-shape bearing and the walls of the mold closed together and held until again released after the molded article has been completed.

I have now described one portion of the mold comprising the outer walls thereof, and within these walls is a core which forms the central opening in the chimney-block and in place of being expansible is contractible. The core comprises four sections G H I J, as shown in Fig. 4 of the drawings, each section forming the corner and a portion of the two sides of said core, the sections I J having overlapping flanges $e$, which overlap the edges of the two adjoining sections G H to form guides therefor. If desired, these overlapping flanges $e$ may be a part of the outer metal lining $f$ of the core by extending the lining beyond the edges of the sections, or the overlapping flanges may be provided in any other suitable manner found best adapted to the purpose that will serve as guides to the movable sections and also close the joint between the adjacent sections, thereby providing a more perfect and practical core for the mold. The sections of the core are rendered contractible by means of the curved spring-plates K, which are curved in opposite directions to that of the spring-plates on the side and end walls of the mold hereinbefore described, as will be seen by reference to Figs. 1 and 3 of the drawings, and are connected to the upper edges of the several sections of the core. As previously stated, the spring-plates K have a curve in an opposite direction to the spring-plates D. The tendency will be to draw the several sections G H I J inwardly instead of outwardly, as in the former case, but acting upon the same principle.

The locking-frame F keeps the side and end walls A B securely closed together against the action of the spring-plates D. Consequently some means must be provided to hold outward the sections of the core against the action of the spring-plates thereon, and one of many means that may be provided resides in the plunger L, having radial arms M to engage wedge-shape spaces $h$ between the lower edges of the sections of the mold, as shown in Fig. 2 of the drawings. When the plunger L is elevated to bring the extremities of the radial arms M in the narrowest portions of the spaces $h$, the sections of the core will be held expanded, and by lowering the plunger the sections of the core will be able to collapse through the medium of the spring-plates connected to the core-sections, thus admitting the ready and convenient withdrawal of the core previous to the releasing of the side and end walls A B of the mold.

It should be understood that the top of the mold and also of the core are of the same size, whether contracted or expanded, and when the core is held expanded it will fit tightly in the cavity in the pallet or support C, as shown in Fig. 3 of the drawings.

When using the terms "side" and "end" walls in describing the mold, the walls are necessarily sections as well as the sections of the core and should be so understood, and it is evident that any suitable spring or springs that will serve to render the sections of the outer walls of the mold and the sections of the core-spring actuated will serve the purpose; but the spring-plates shown and described are considered the most simple and practical to render the sections expansible and contractible, as hereinbefore described.

Any suitable locking means may be employed for holding the side and end wall sections contracted and releasing them when desired, although I have shown what I consider the most practical and effective for the purpose intended, as is also the plunger for holding the sections of the core expanded and against collapsing and releasing it in order that the sections may contract to render the core more readily removed.

In describing the several details of construction it will be evident that many changes or modifications may be resorted to without in any manner departing from the essential features of the invention—as, for instance, such changes as would come within the ordinary mechanical judgment of the artisan or as experience would bring to the notice of those using the mold.

Having now fully described my invention, what I claim as new, and desire to secure by Letters Patent, is—

1. A mold comprising a plurality of expansible and contractible spring-actuated sections connected together at their upper ends, and means for holding the sections against the action of the spring and releasing the sections so that the sections may be acted upon thereby, substantially as and for the purpose set forth.

2. A mold comprising a plurality of expansible and contractible sections, spring-plates connected to the upper edges of the sections whereby the same are connected together and rendered spring-actuated, and means for holding the sections against the action of the springs and releasing them, substantially as and for the purpose described.

3. A mold comprising a plurality of spring-actuated sections connected together at their top, wedge-shape bearings secured to the sections and also stops, and a locking-frame around the sections and engaging the wedge-shape bearing to hold the sections closed or release them, substantially as and for the purpose specified.

4. In a mold, a plurality of spring-actuated sections to form the outer walls thereof, means for holding said sections together and releasing them, and a core comprising a plurality of spring-actuated sections, said sections having tapering spaces between their lower edges, and a plunger with radial arms adapted to engage the spaces to expand the sections against the action of the spring and to release them whereby the spring may contract said sections, substantially as and for the purpose set forth.

In testimony whereof I affix my signature in presence of two witnesses.

HENRY N. JASPER, Sr.

Witnesses:
RICHARD W. REMY,
ROSE B. REMY.